United States Patent
Liegeois et al.

(10) Patent No.: US 8,604,733 B2
(45) Date of Patent: Dec. 10, 2013

(54) ELECTRIC ACTUATOR INCLUDING TWO CURRENT-CONTROLLED VOLTAGE INVERTERS POWERING AN ELECTRICAL MACHINE, AND RECONFIGURABLE IN THE PRESENCE OF A DEFECT

(75) Inventors: Pierre-Yves Liegeois, Suresnes (FR); François-Noël Leynaert, Montmorency (FR); Farid Meibody-Tabar, Villers-les-Nancy (FR); Serge Lionel Pierfederici, Velaine en Haye (FR); Babak Nahid Mobarakeh, Villers-les-Nancy (FR)

(73) Assignees: Messier-Bugatti-Dowty, Velizy Villacoublay (FR); Universite de Lorraine, Nancy Cedex (FR); Centre National de la Recherche Scientifique, Paris (FR)

( * ) Notice: Subject to any disclaimer, the term of this patent is extended or adjusted under 35 U.S.C. 154(b) by 318 days.

(21) Appl. No.: 13/119,625

(22) PCT Filed: Sep. 23, 2009

(86) PCT No.: PCT/FR2009/001126
§ 371 (c)(1),
(2), (4) Date: Apr. 11, 2011

(87) PCT Pub. No.: WO2010/034906
PCT Pub. Date: Apr. 1, 2010

(65) Prior Publication Data
US 2011/0181219 A1    Jul. 28, 2011

(30) Foreign Application Priority Data
Sep. 24, 2008 (FR) ..................... 08 05240

(51) Int. Cl.
H02P 6/14    (2006.01)
H02P 6/08    (2006.01)

(52) U.S. Cl.
CPC ..................... H02P 6/085 (2013.01)
USPC ............ 318/400.29; 318/400.26; 318/400.01; 318/700

(58) Field of Classification Search
CPC ........................................... H02P 6/085
USPC .................. 318/400.29, 400.26, 400.01, 700
See application file for complete search history.

(56) References Cited

U.S. PATENT DOCUMENTS 6,222,285 B1 *  4/2001  Haley et al. .................... 307/129
7,098,619 B2 *  8/2006  Stridsberg ..................... 318/563

(Continued)

FOREIGN PATENT DOCUMENTS

EP    1 494 343 A2    1/2005
EP    1 513 251 A2    3/2005

(Continued)

*Primary Examiner* — Bentsu Ro
*Assistant Examiner* — David Luo
(74) *Attorney, Agent, or Firm* — Sughrue Mion, PLLC

(57) ABSTRACT

The invention relates to an actuator including an electrical machine. The electrical actuator (100) comprising: a polyphase machine (101); at least one connection member (143) for powering the actuator from at least one network (146) delivering alternating current; and first and second buses (106, 107) connected in parallel between each connection member (143) and the machine (101) for applying frequency control thereto. Each inverter (111, 131) comprises a plurality of arms each having two controlled switches, each phase of the machine (101) being connected both to the two switches of an arm of the first inverter (111) and also to the two switches of an arm of the second inverter (131). The actuator further comprises controlled connection and disconnection means interposed between each bus (106, 107) and each connection member. The invention is applicable to actuators used in aviation.

5 Claims, 6 Drawing Sheets

(56) References Cited

U.S. PATENT DOCUMENTS

| | | |
|---|---|---|
| 7,940,018 B2 * | 5/2011 | Yonemori et al. ............ 318/376 |
| 8,008,876 B2 * | 8/2011 | Yonemori et al. ............ 318/151 |
| 2005/0162877 A1 | 7/2005 | Wagoner et al. |
| 2007/0114958 A1 | 5/2007 | Serrano et al. |
| 2008/0218114 A1 | 9/2008 | Raulin et al. |

FOREIGN PATENT DOCUMENTS

| | | |
|---|---|---|
| FR | 2 844 401 A1 | 3/2004 |
| WO | 02/082629 A1 | 10/2002 |

\* cited by examiner

ELECTRIC ACTUATOR INCLUDING TWO CURRENT-CONTROLLED VOLTAGE INVERTERS POWERING AN ELECTRICAL MACHINE, AND RECONFIGURABLE IN THE PRESENCE OF A DEFECT

The invention relates to an electrical actuator for fitting to an aircraft in order to control a piece of equipment of said aircraft.

BACKGROUND OF THE INVENTION

In the field of aviation, it is expected that a system for controlling a piece of equipment will be available continuously. This means that in the event of a failure of any component in the system, the control system must be capable of operating, e.g. in a "limp-home" mode, so as to operate the equipment in spite of the failure. Thus, when a failure is detected in flight, the system can continue to operate.

In this context, the control systems actually in use in the field of aviation are hydraulic: they comprise a hydraulic actuator of the cylinder type, and a hydraulic network interposed between the cylinder and a control member.

The network then has two hydraulic circuits that are distinct and independent: in the event of either circuit failing, e.g. as a result of a leak, the other circuit remains available to control the hydraulic actuator.

Present trends in aviation are leading to hydraulic control systems being replaced by electrical control systems.

In this context, it has been decided to use actuators having motors that are electrical machines, in particular of the synchronous type having permanent magnets, which machines can be servo-controlled in speed, in position, or in force, while also being sufficiently lightweight.

Varying the speed of such machines requires the frequency of the current or the voltage that is applied thereto to be varied, which requires a static converter to be incorporated in order to vary the control in compliance with control variables. When the electrical power supply is single-phase, three-phase, or polyphase, the converter may be constituted by a rectifier that is not controlled, having diodes, or by a rectifier that is controlled, which rectifier is associated with an inverter.

Nevertheless, that type of inverter has arms, each of which includes two control switches or transistors that may become blocked in an open state or in a closed state. When one of the transistors is faulty, control is significantly complicated by the fact that the magnitude of the current passing through the arms that remain sound can then no longer be controlled.

Various solutions can be envisaged for the electrical power supply: the electrical power supply network may be a single three-phase network that is sufficiently secure to be considered as being reliable.

It is also possible for two distinct three-phase networks to be provided, in a manner analogous to hydraulic control systems. The two networks may then be either electrically isolated from each other or they need not be isolated.

When the two three-phase networks are isolated, the neutral of one of them is independent of the neutral of the other, and when it is not possible for them to be electrically isolated, their neutrals are either at the same potential or else they are connected together via inductive and/or resistive elements.

OBJECT OF THE INVENTION

The object of the invention is to propose an actuator arrangement having an optimized level of availability, in particular when faced with failure of a controlled switch in an inverter, often constituted by a transistor, and that can be used with the various possible electrical power supply network architectures.

SUMMARY OF THE INVENTION

To this end, the invention provides an electrical actuator comprising: a polyphase electrical machine; at least one connection member for connection to an electrical power supply network; first and second buses connected in parallel between the machine and each connection member, the first and second buses including respective first and second inverters for applying frequency control to the machine, each inverter having a plurality of arms each provided with two controlled switches, each phase of the machine being continuously connected both to the two switches of an arm of the first inverter and also to the two switches of an arm of the second inverter; and connection and disconnection control means interposed between the buses and each connection member.

With this architecture, the actuator may be controlled to power the machine via one and/or the other of its buses, thereby providing various reconfiguration options either in normal operation, or in the event of a fault appearing in an electrical power supply network, in an inverter, or in a rectifier, or indeed more generally in a bus, or even in a winding of the electrical machine.

The controlled connection means enable an inverter to be completely isolated from the power supply network(s) so as to put the machine into a star configuration with a central node, thus enabling the current flowing in each of the windings to be controlled.

The connection means also enable the actuator to be powered in normal operation from one or more electrical networks, such that the actuator can be used with the various possible configurations of the electrical power supply network.

The invention also provides an actuator of the above-defined type, wherein the controlled connection and disconnection means comprise a first contactor interposed between the first bus and a connection member having a single network, and a second contactor interposed between the second bus and the same connection member.

The invention also provides an actuator as defined above, having first and second connection members for powering the actuator from two distinct power supply networks, and wherein the controlled connection and disconnection means comprise a first contactor connecting the first bus to the first connection member and a second contactor connecting the second bus to the second connection member.

The invention also provides an actuator as defined above, having first and second connection members for powering said actuator from two distinct power supply networks, and wherein the controlled connection and disconnection means comprise a first contactor connected to the first bus, a second contactor connected to the second bus, and a two-position switch for connecting the first and second contactors either to the first connection member or to the second connection member.

The invention also provides an actuator as defined above, having first and second connection members for powering said actuator from two distinct power supply networks, and wherein the controlled connection and disconnection means comprise a first three-position switch connected to the first bus and to the first and second connection members, and a second three-position switch connected to the second bus and to the first and second connection members.

The invention also provides an actuator as defined above, having an electricity storage member and a two-position switch that are interposed between the connection member and the inverter of one of the buses, said electricity storage member having one terminal connected to the connection member and to the inverter and one terminal connected to the two-position switch so as to be connected either to the connection member in order to be recharged, or to the inverter in order to power it or to be charged therefrom.

The invention also provides an actuator as defined above, including a multiple switch connected to the two switches in each arm of one of the inverters, said switch being capable of occupying an open position in which said arms are isolated from one another or a closed position in which said arms are electrically connected to one another.

DETAILED DESCRIPTION OF THE INVENTION

Figure 1:
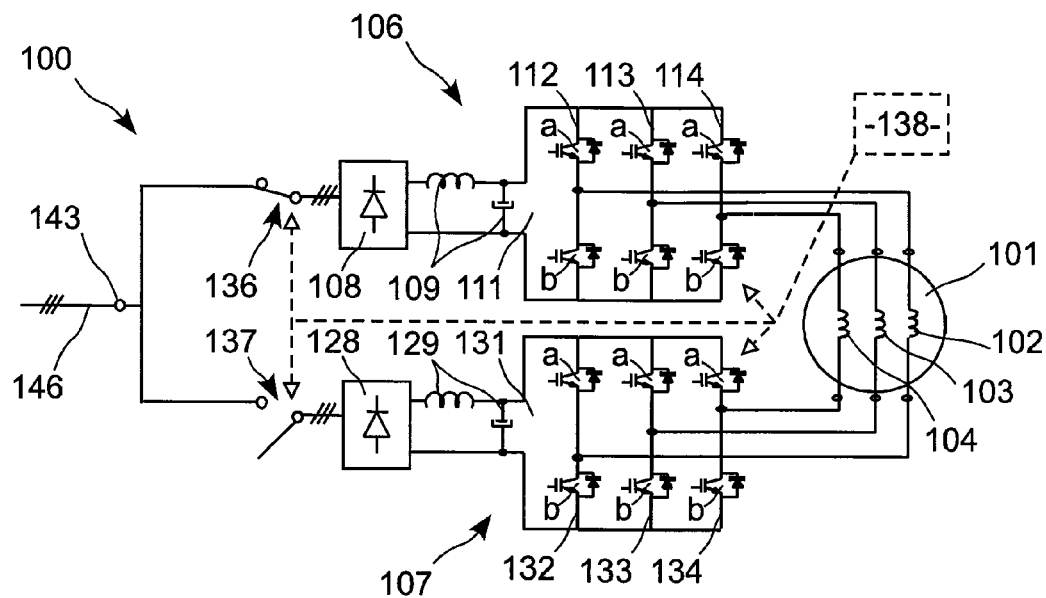
FIG. 1 is a schematic of a first embodiment of the invention in which the actuator has connection means including two contactors connecting it to a single electricity power supply network.

The actuator of the invention, referenced 100 in FIG. 1, comprises a three-phase electrical machine 101 including three windings 102, 103, 104 and first and second distinct buses 106 and 107. These buses convert the alternating current from the network at a frequency that may be fixed or variable into alternating current at a frequency that is variable and that is injected into the synchronous machine in order to control it in frequency.

The first bus 106 comprises in succession: a rectifier 108; an LC type filter 109, i.e. a filter comprising an inductor and a capacitor; and a three-phase inverter 111. The three-phase inverter 111 has three arms 112, 113, and 114, each provided with two controlled switches references respectively 112a, 112b, 113a, 113b, 114a, and 114b.

The second bus 107 also comprises in succession: a rectifier 128; an LC type filter 129; and a three-phase inverter 131. The three-phase inverter likewise has three arms 132, 133, and 134, each provided with two controlled switches referenced respectively 132a, 132b, 133a, 133b, 134a, and 134b.

Each winding of the machine is connected to an arm of each inverter, one of its ends being directly connected to the two switches of a branch of the first inverter 111, and its other end being directly connected to the two switches of an arm of the second inverter 131.

The winding 102 thus has a first end connected to the two switches 112a and 112b of the arm 112 of the first inverter 111, and a second end connected to the two switches 132a and 132b of the arm 132 of the second inverter 131. In analogous manner, the winding 103 is connected to the arms 113 and 133, and the winding 104 is connected to the arms 114, and 134.

The actuator also has a first contactor 136 whereby the first rectifier 108 is connected to the single three-phase electrical network 146, and a second contactor 137 whereby the second rectifier 128 is connected to the three-phase network 146, via a connection member 143. In the description of this embodiment and of other embodiments of the invention, the term "contactor" is used to designate a controlled switch that has circuit-breaking power. It may be a mechanical switch of the contactor or circuit-breaker type, or it may be an electronic switch of the type that is bidirectional in current and in voltage.

This assembly constitutes an actuator architecture with non-isolated series redundancy and it is controlled by a control unit referenced 138, which unit is connected to the contactors and to each of the controlled switches of the first and second inverters.

In normal operation, the windings of the synchronous machine can be powered either jointly by both buses 106 and 107, or else via a single one of these two buses.

In normal operation, with the machine being powered by both buses, both contactors 136 and 137 are closed, and the switches of the two inverters 111 and 131 are controlled to apply voltages to the windings 102, 103, and 104 at frequency and amplitude that are controlled and variable.

In this configuration, the machine is powered by a voltage that may be doubled since the voltage that is applied thereto is equal to the difference between the voltages applied by both of the inverters. This voltage is doubled if the commands to the arms of the two inverters are complementary and if the direct current voltages at the buses have the same values. Compared with circumstances in which the three-phase machine is powered using a single inverter, this can enable it to be caused to rotate at up to twice the speed, thereby optimizing the operation thereof.

In normal operation, when the machine is powered by only one of its buses, electrical losses are reduced because only one bus is being operated dynamically. One of the contactors 136 or 137 is then kept open and the corresponding inverter 111 or 131 is controlled so as to keep its switches closed and thereby put the windings of the machine 101 into a star configuration.

The other contactor 137 or 136 is kept closed, and the switches of the inverter 131, 111 corresponding to said other contactor are controlled dynamically so as to apply voltages to the windings 102, 103, and 104 of frequency and amplitude that are controlled and variable.

In the event of one of the buses failing, e.g. in the event of a failure of one of the switches of the inverter that is controlled dynamically, the machine is reconfigured by the control unit so as to adopt another mode of operation that enables it to deliver mechanical torque in spite of the failure.

In this other mode of operation, the machine may be powered by both inverters or by a single inverter.

In the event of a failure due to a switch that is blocked in an open state, it is thus possible to close or keep closed both contactors 136 and 137, and to inhibit the switches of the arms connected to the phase including the faulty switch so that the switches are open, thereby preventing current flowing in that phase.

By imposing currents of appropriate waveform to the two remaining phases, it is possible to generate the desired torque while minimizing Joule losses. Under such circumstances, the waveforms are deduced from the form of the no-load electromotive forces, from the position of the rotor, and from the desired constant torque, so as to control the magnitude of the current injected into the phases that are sound.

It should be observed that this reconfiguration also makes it possible to counter a faulty phase in the synchronous machine, i.e. a failure due to one of its windings breaking, thereby causing no current to flow in one of the phases of the electrical machine.

When it is desired to power the machine using a single inverter while a switch has been detected as being faulty, the machine is put into a star configuration, and various situations can be distinguished.

For example, if the switch 132a of the second inverter 131 becomes blocked in an open state, then the contactor 137 is controlled to take up an open position so as to disconnect the entire second bus 107 from the three-phase electrical network, and the switches 132b, 133b, and 134b are controlled so as to be closed continuously.

If the switch 132a becomes blocked in a closed state, then the contactor 137 is controlled to be open so as to disconnect the second bus 107, and the switches 133a, 134a are controlled so as to be closed continuously.

In either situation, the windings 102, 103, and 104 of the machine 101 are in a star configuration. The first contactor 136 is kept closed in order to power the machine 101 via the first bus 106. The first inverter 111 is then controlled to apply voltages to these windings that are at frequency and amplitude that are conditioned by the servo-control.

Thus, because of the possibility of disconnecting one of the buses completely from the power supply network, the connections between the two buses take place solely via the electrical machine. The machine is then reconfigured into a star configuration, with its central node being at a potential that is floating since it is completely disconnected from the network. The sum of the currents flowing through the windings of the machine is then zero, thereby giving rise to nominal operation of the machine, thus making it possible in particular to control the magnitude of the current that is injected into it.

Fault detection is provided by measuring the direction in which current flows through one or another of the phases of the synchronous machine and by measuring the potential of one of said phases.

Figure 2:
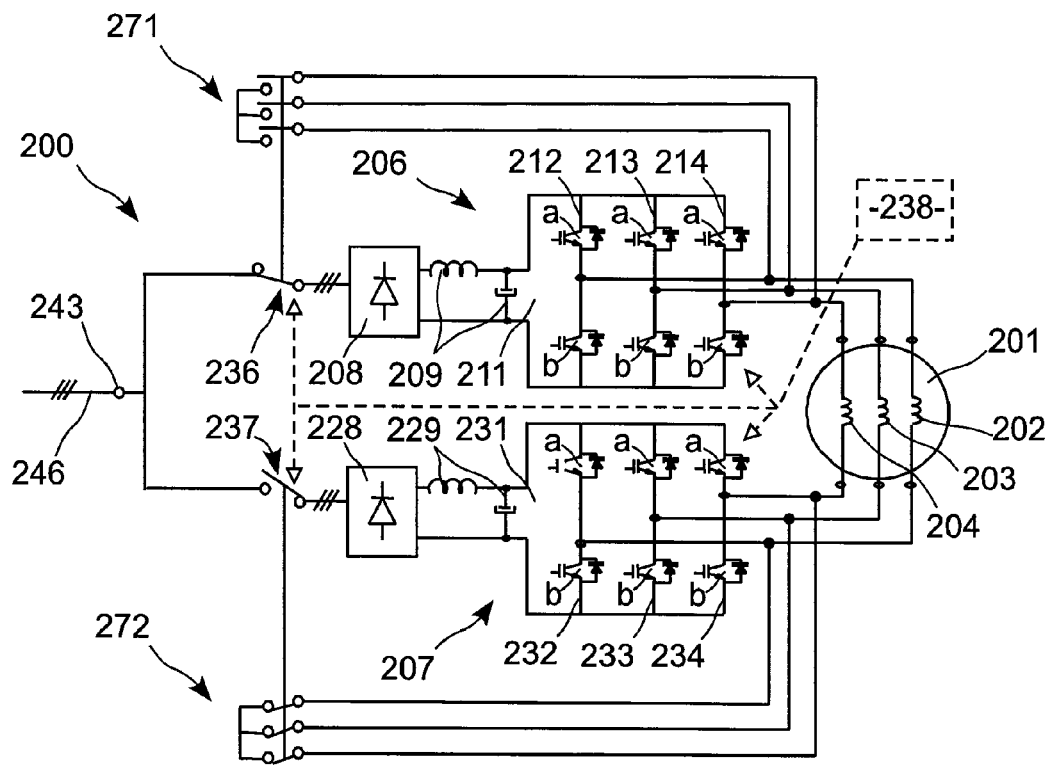
FIG. 2 is a schematic of a variant of the first embodiment of the invention in which the actuator is fitted with additional triple switches.

Advantageously, the actuator is fitted with additional reconfiguration means, as in the variant constituted by the actuator 200 of FIG. 2.

This actuator 200 has all of the members of the actuator of FIG. 1, which members are given numerical references corresponding to those of the actuator 100, plus one hundred.

Additionally, the actuator 200 includes a first controlled triple switch 271 that is connected to each of the arms 212, 213, 214 of the first inverter 211, and a second triple switch 272 that is connected to each of the arms 232, 233, and 234 of the second inverter 231. These components 271 and 272 are advantageously of the normally-closed bidirectional static or contactor type.

The switch 271 may occupy an open position as shown in FIG. 2 in which the three arms of the first inverter are isolated from one another while the first inverter is powering the machine 201. The switch may also occupy a closed position, in which it connects together the three arms 212, 213, and 214, so as to put the three windings 202, 203, and 204 into a star configuration, without it being necessary to control the controlled switches of the first inverter.

The triple switch 271 is advantageously coupled to the contactor 236 for disconnecting the first bus 206 in such a manner that when the contactor 236 for connecting the first bus 206 is closed, the triple switch 271 is open, and vice versa. Thus, opening the contactor 236 causes the triple switch 271 to be closed, thereby having the effect of electrically isolating all of the first bus, and of putting the windings of the machine 201 into a star configuration while inhibiting (blocking) the transistors of the first inverter 211.

The second triple switch 272 keeps the arms 232, 233, and 234 isolated from one another while it is open, and it connects them to one another while it is closed, so as to put the machine 201 in a star configuration. It is advantageously coupled to the second contactor 237 in a manner that is analogous to the coupling of the first triple switch.

This variant of FIG. 2 further improves the availability of the actuator, since it enables the machine to be put into a star configuration with a central node, including under circumstances in which such reconfiguration cannot be obtained by controlling the faulty inverter. Such a situation may arise, for example, when both switches in a given arm of the inverter are blocked in the open position.

Figure 3:
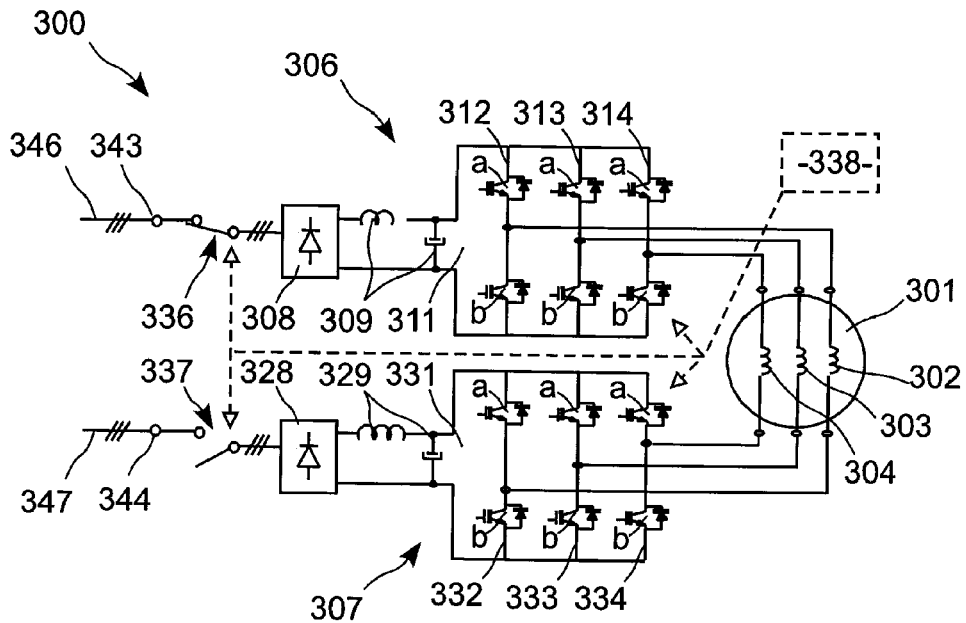
FIG. 3 is a schematic of a second embodiment of the invention in which the actuator has connection means including two contactors connecting it to two electrical networks, each powering one inverter of the actuator.

In a second embodiment, the actuator as shown in FIG. 3 under the reference 300 is powered by two distinct three-phase electrical networks. This actuator 300 has all of the members of the actuator 100 of FIG. 1, these members carrying numerical references corresponding to those of the actuator 100 plus two hundred.

The actuator 300 has two inlet connection members referenced 343 and 344 that are situated respectively in register with its first bus 306 and with its second bus 307, which members are connected respectively to first and second three-phase electrical power supply networks referenced 346 and 347.

The first contactor 336 connects the rectifier 308 of the first bus 306 to the first connection member 343, while the second contactor 337 connects the rectifier 328 of the second bus 307 to the second connection member 344. The first bus 306 is thus powered by the first three-phase electrical network 346, and the second bus 307 is powered by the second three-phase electrical network 347.

Operation is similar to that of the actuator 100 of FIG. 1: in the event of a fault being detected in one of the buses, the bus can be disconnected and controlled so as to put the machine into a star configuration, with a node at zero potential, the machine then being powered by the other inverter that is not faulty.

Figure 4:
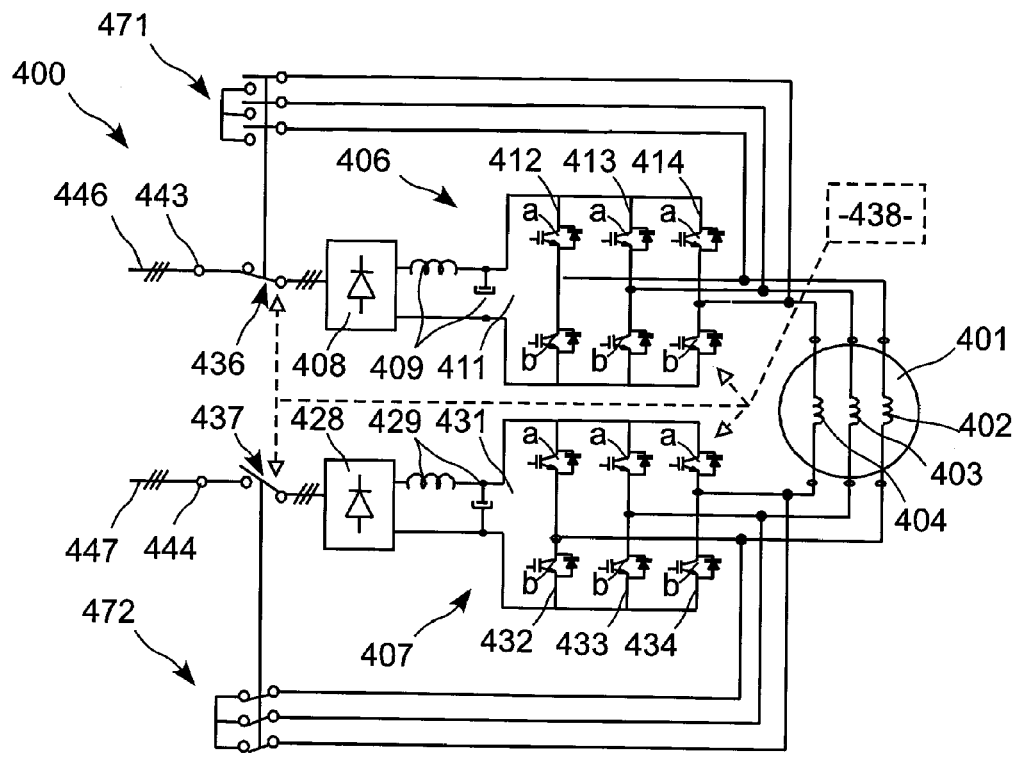
FIG. 4 is a schematic of a variant of the second embodiment of the invention in which the actuator is fitted with additional triple switches.

In FIG. 4, there can be seen an actuator 400 that is a variant of the actuator shown in FIG. 3. It has all of the members of the actuator 300 of FIG. 3, these members being given numerical references corresponding to those of the actuator 300, plus one hundred.

This actuator 400 of FIG. 4 is a variant of the same type as the variant constituted by the actuator 200 of FIG. 2. It likewise has first and second triple switches 471 and 472 that are connected respectively to the first and second buses 406 and 407, and that are coupled respectively to the contactors 436 and 437 that are associated with said buses.

As in FIG. 2, these triple switches serve to reconfigure the phases of the machine 401 into a star configuration without it being necessary to control either the first or the second inverter.

In a third embodiment of the invention, the actuator is powered by first and second three-phase electrical networks, while also including means enabling each of its two buses to be powered either by one or by the other one of these networks.

Figure 5:
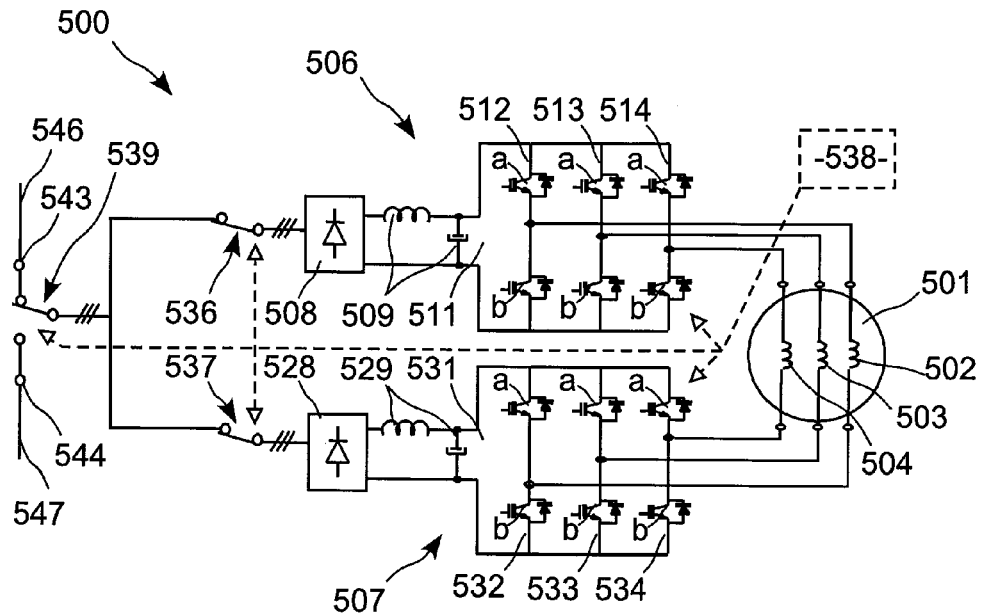
FIG. 5 is a schematic of a third embodiment of the invention in which the actuator has connection means including two contactors and a controlled switch for selectively connecting each inverter to one or the other of two distinct electrical networks.

This actuator 500 is shown in FIG. 5 and has general structure of the same type as the actuator 300 of FIG. 3. It has all of the members of the actuator 300 of FIG. 3, these members being given numerical references that correspond to those of the actuator 300, plus two hundred.

This other actuator has two inlet connection members 543 and 544 that are connected to respective ones of the two three-phase networks 546 and 547. The two contactors 536 and 537 that are connected respectively to the first and second rectifiers are connected to the two connection members 543 and 544 via a changeover switch having two additional positions, the switch being referenced 539 and being controlled by the control unit 538. This switch 539 is advantageously a contactor of the 3PDTCO type.

This switch may occupy either a first position as shown in FIG. 5 in which it connects the first connection member 543 electrically to the first contactor 536, or else a second position in which it connects the second connection member 544 electrically to the second contactor 537.

In normal operation, the switch 539 may occupy the first position: the first contactor 536 is then closed and the second contactor 537 is open, the switches of the second inverter being controlled to cause the windings of the machine to have a star configuration. The machine 501 is then in a star configuration and is powered from the first three-phase electrical network 546 via the first bus 506.

Starting from this situation, in the event of a fault appearing on the first bus 506, the first contactor 536 is opened and the first inverter is controlled to close its switches, and then the second contactor 537 is closed. The machine is then once more in a star configuration, being powered from the first three-phase network 546, but via the second bus 507.

In this situation, if a fault should occur in the first power supply network 546, the switch 539 is changed over to its second position, thereby enabling the machine to be powered from the second three-phase network 547, via the second bus 507.

Other normal modes of operation are also possible. Both contactors 536 and 537 may be closed so as to power the machine via both inverters. The switch 539 then allows the actuator to be connected either to the network 546 or else to the network 547.

In the event of one of the networks being faulty, the switch 539 enables the actuator to be connected to the other network.

In the event of one of the inverters being faulty, the contactor 536 or 537 associated with the faulty inverter is opened and the faulty inverter is controlled so as to put the windings of the electrical machine into a star configuration. Under such circumstances, the machine is powered by one of the two networks as selected by the position of the switch 539, and via the non-faulty inverter by closing the contactor 536 or 537 that is associated therewith.

In a variant, the actuator is provided with additional triple switches in order to enable a star configuration to be established without it being necessary to act on either of the first or second inverters.

Figure 6:
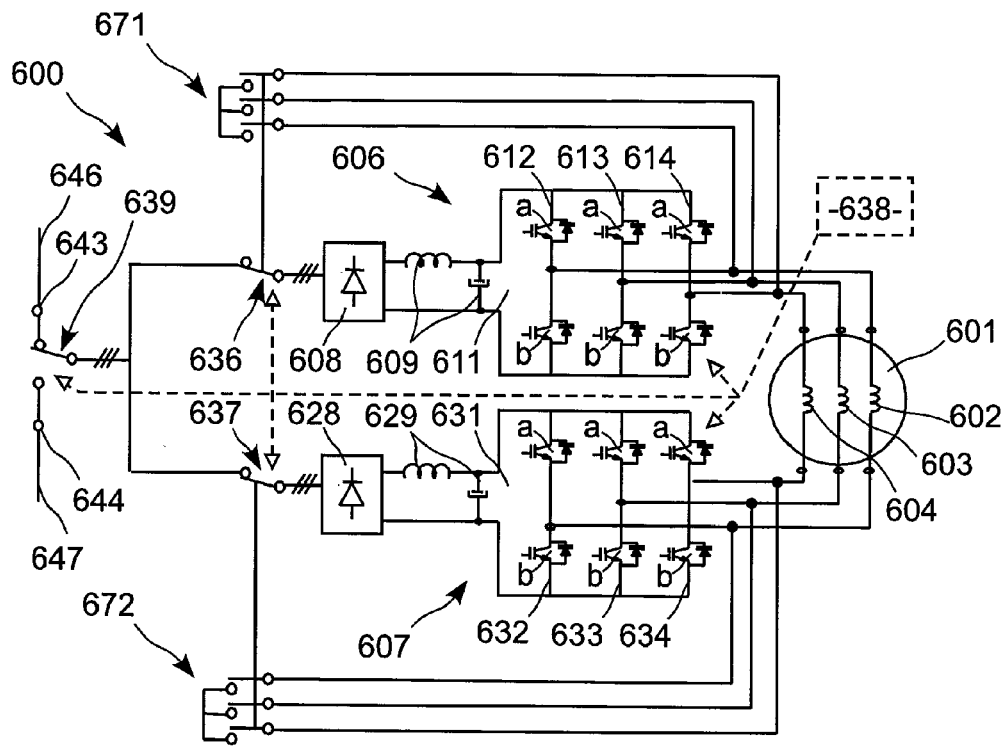
FIG. 6 is a schematic of a variant of the third embodiment of the invention in which the actuator is fitted with additional triple switches.

This variant corresponds to the actuator 600 of FIG. 6. This actuator 600 has all of the members of the actuator 500 of FIG. 5, these members being given numerical references corresponding to those of the actuator 500, plus one hundred.

The actuator 600 of FIG. 6 is a variant of the same type as the variants 200 and 400 of FIGS. 2 and 4. It likewise has first and second triple switches 671 and 672 that are connected respectively to the first and second buses 606 and 607, and that are coupled respectively to the contactors 636 and 637 of these buses.

As for the actuators 200 and 400, these triple switches serve to reconfigure the phases of the machine 601 into a star configuration without it being necessary to control either the first or the second inverter.

Figure 7:
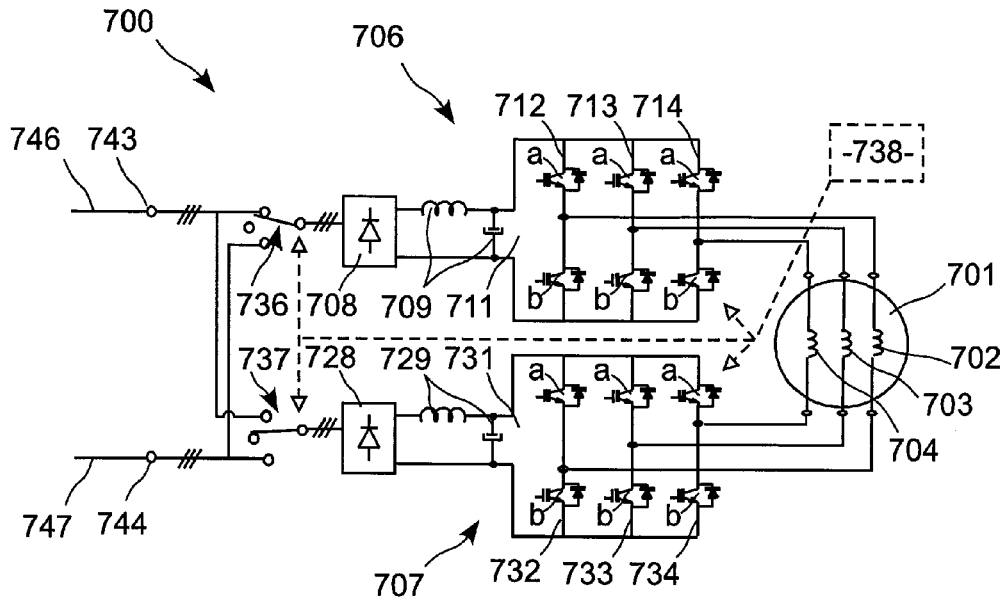
FIG. 7 is a schematic of a fourth embodiment of the invention in which the actuator has connection means including two contactors in the form of controlled switches for selectively connecting each inverter to one or the other of two distinct electrical networks.

In a fourth embodiment corresponding to the actuator 700 of FIG. 7, the actuator is powered by first and second three-phase electrical networks, while including two three-position switches enabling each of its two inverters to be powered by one or the other of these networks.

This actuator 700 presents a general structure of the same type as the actuator 300 of FIG. 3. This actuator 700 has all of the members of the actuator 300 of FIG. 3, these members being given numerical references corresponding to those of the actuator 300, plus four hundred. Nevertheless, the first and second contactors, referenced 736 and 737 in this embodiment, are switches that have three positions, instead of being simple on/off switches as in the actuator 300. These components 736 and 737 are advantageously contactors of the 3PDTCO type.

As shown in FIG. 7, this switch may occupy a first position in which it connects the first contactor 736 to the first connection member 743. It may occupy a second position in which it connects the contactor 736 to the second connection member 744, and it may occupy a third position in which it isolates the first contactor 736 completely from the electrical network.

This switch is thus suitable for powering the first bus 706 from the first three-phase electrical network 746 when it is in the first position of FIG. 7. When it is in the second position, it powers said first bus 706 from the second three-phase electrical network 747. When it is in the third position, the first bus is disconnected from both of the electrical networks 746 and 747.

The second switch has the same general structure and is thus likewise capable of powering the second bus from the first network or from the second network, or of disconnecting it from both networks.

This actuator 700 possesses the same advantages as the actuator 500 since it can be controlled to power each of the buses 706 and 707 electrically, either from the first electrical network 746 or from the second electrical network 747.

Figure 8:
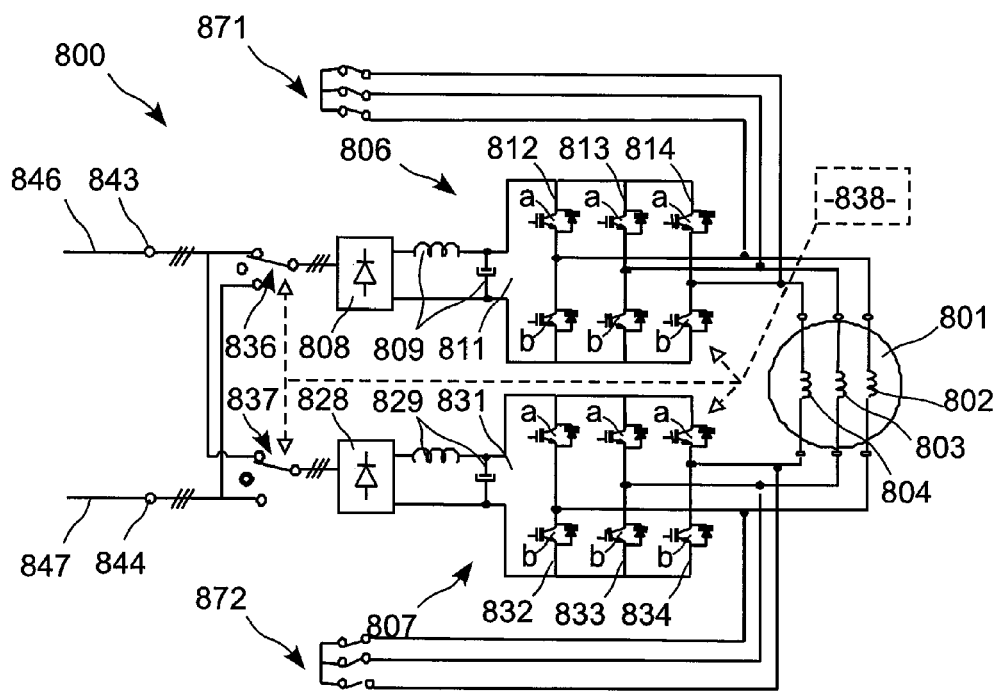
FIG. 8 is a schematic of a variant of the fourth embodiment of the invention in which the actuator is fitted with additional triple switches.

In a variant corresponding to the actuator 800 of FIG. 8, the actuator is provided with two triple switches in a manner analogous to the actuators 200, 400, and 600 of FIGS. 2, 4, and 6.

The first and second triple switches 871 and 872 likewise serve to reconfigure the machine into a star configuration without it being necessary to act on the first inverter or the second inverter.

In this embodiment, the triple switches are not coupled to the bus contactors since the contactors are three-position switches. However the triple switch and the contactor associated with each bus are controlled jointly by the control unit 838.

Figure 9:
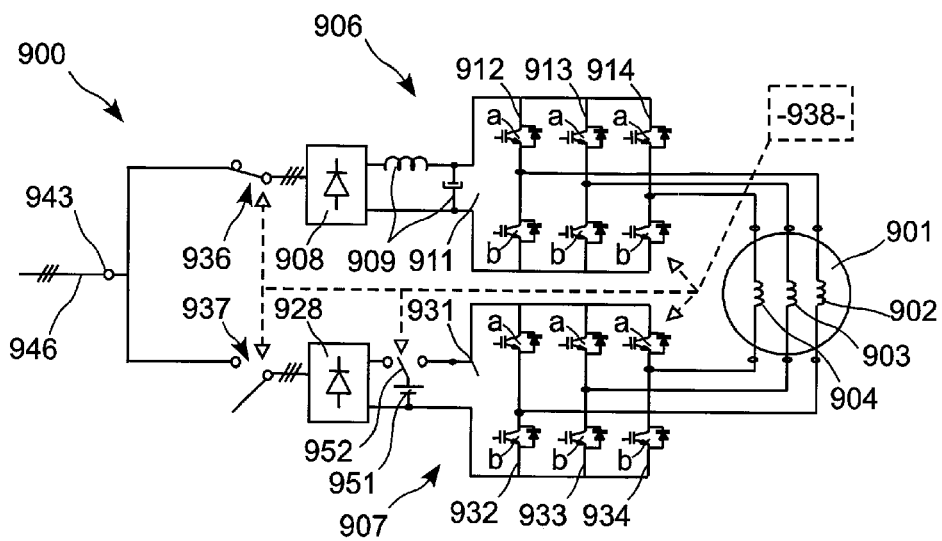
FIG. 9 is a schematic of a fifth embodiment of the invention in which the actuator has an electrical energy storage member and connection means including two contactors connecting it to a single electrical network.

In a fifth embodiment shown in FIG. 9, one of the buses of the actuator includes a battery associated with a switch so as to be capable of being recharged by the three-phase electrical power supply network, or to power the machine, depending on the position occupied by said switch.

This actuator 900 has the same members of the actuator 100 of FIG. 1, these members being given the same numerical references as for the actuator 100, plus eight hundred. Nevertheless, a battery 951 and a switch 952 are interposed between the rectifier 928 and the inverter 931 of the second bus 907 instead of an LC filter as in the actuator 100.

The battery of the actuator 900 is incorporated in its second bus 907 where it replaces the LC filter by being interposed between the rectifier 928 and the inverter 931. This battery 951 has its first terminal connected to the rectifier 928 and to the inverter 931, and its second terminal connected to a two-position switch 952.

The switch 952 may occupy a first position in which it connects the second terminal of the battery to the rectifier in order to charge the battery. It may occupy a second position in which it connects the second terminal of the battery to the second rectifier 931 in order to power the machine 901 from the battery and via said inverter 931.

In normal operation, both contactors 936 and 937 may be closed, and the switch 952 may be placed in the first position. The battery 951 is then recharged by the three-phase network, and the second inverter 931 is isolated from the network because the switch 952 is in the first position. These components 936 and 937 are advantageously contactors of the 3PDTCO type.

Under such circumstances, the second inverter 931 is controlled to close its switches so as to put the phases of the machine 901 into a star configuration, the machine then being powered by the network via the first inverter 911.

In the event of the first bus 906 malfunctioning, the first contactor 936 is opened and the first inverter 911 is controlled to put the phases of the machine 901 into a star configuration. The switch 952 is then controlled by the control unit 938 to pass into its second position with the second inverter 931 then being controlled to power the electrical machine 901.

In this situation, the machine is thus powered from the battery 951 via the second inverter 931, with its phases in a star configuration, having a central node at a potential that is floating as a result of the first contactor 936 being opened and as a result of the switches of the first inverter 911 being closed.

In this fifth embodiment, the battery may also be used in a regenerative mode: when the machine operates in generator mode instead of in motor mode, the battery may be charged by the machine instead of being charged by the network.

The battery may also be operated to limit the maximum power absorbed by the actuator: when the actuator absorbs its maximum power only occasionally, the battery may be charged while the actuator is absorbing power at low electrical power only, and it may be used when the actuator needs to have maximum electrical power.

Figure 10:
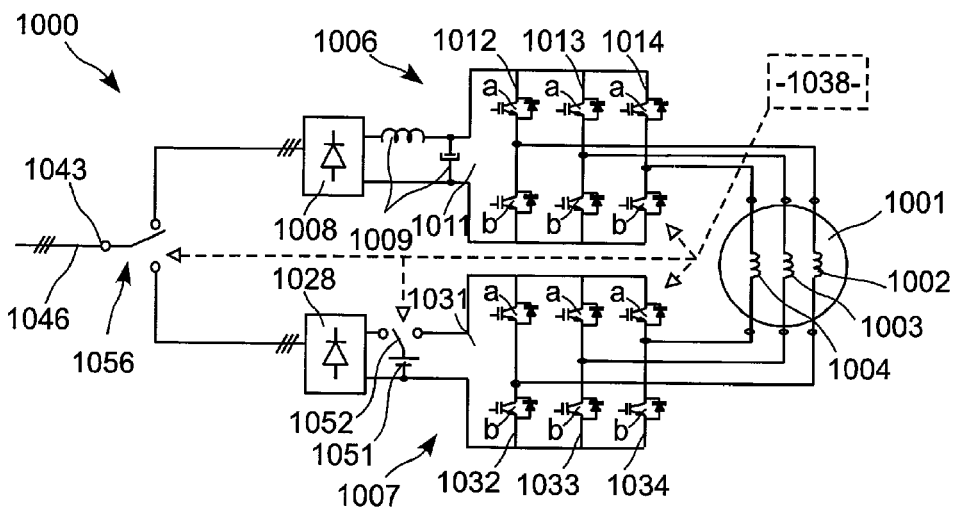
FIG. 10 is a schematic of a sixth embodiment of the invention in which the actuator has an electrical energy storage member and connection means including a contactor in the form of a controlled switch connecting it to a single electrical network.

In a sixth embodiment shown in FIG. 10, the actuator is likewise fitted with a battery, but its buses are connected to the power supply network not via two contactors, but via a single switch having two positions.

This actuator 1000 has the same members as the actuator 900 of FIG. 9, which members are identified by numerical references corresponding to those of the actuator 900, plus one hundred. Nevertheless, in this embodiment a two-position switch 1056 is interposed between the connection member and the buses, instead of the two controlled switches of the actuator 900.

In this actuator 1000, both buses are connected to the single connection member 1043, not via two independent contactors, but via a two-position switch referenced 1056. This component 1056 is advantageously a contactor of the 3PDTCO type.

This switch has a first terminal connected to the first rectifier 1008 of the first bus 1006, a second terminal connected to the second rectifier 1028 of the second bus 1007, and a third terminal connected to the power supply terminal 1043 of the three-phase network 1046.

This switch may occupy a first position in which it connects the first rectifier 1008 to the connection member 1043 in order to power the electrical machine 1001 from the three-phase network 1046 and via the first bus 1006, e.g. in normal operation.

It may also occupy a second position in which it connects the second rectifier 1028 to the connection member 1043. If the switch 1052 of the battery 1051 is in its first position, then the battery is charged by the electrical network 1046 via the rectifier 1028. This configuration serves in particular to charge the battery 1051 while the actuator is not being used. The switch 1052 is advantageously a contactor of the 3PDTCO type.

Starting from a normal operation situation, if a fault is detected on the first bus, the switch 1056 is controlled by the unit 1038 to take up the second position and the switches of the first inverter 1011 are caused to be closed, thereby having the effect of putting the phases of the machine 1001 into a star configuration with a central node at a potential that is floating.

The switch 1052 may than be placed in its second position by the control unit 1038, which then also controls the second inverter so that it powers the electrical machine 1001, which machine is thus powered from the battery.

In this sixth embodiment, the battery may also be used in regenerative mode, in a manner analogous to the fifth embodiment. It also serves to limit the maximum power drawn by the actuator from the power supply network.

Figure 11:
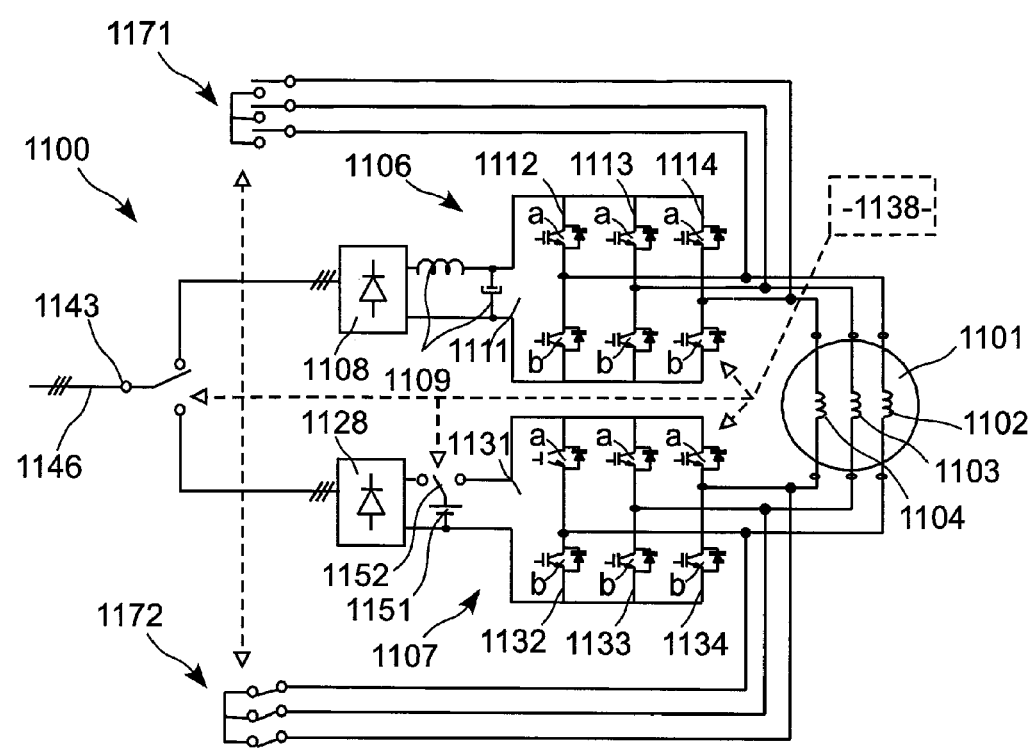
FIG. 11 is a schematic of a variant of the sixth embodiment of the invention in which the actuator is provided with additional triple switches.

FIG. 11 shows a variant of the actuator 1000 of FIG. 10. This actuator 1100 is a variant of the same type as the variants of FIGS. 4, 6, 8, and 10. Once more the actuator is provided with first and second triple switches 1171 and 1172 that are connected respectively to its first and second buses 1106 and 1107.

As in FIGS. 2, 4, 6, and 8, these triple switches enable the phases of the machine 1101 to be reconfigured into a star configuration, without it being necessary to control either the first or the second inverter. However these triple switches in this embodiment are independent, i.e. they are controlled directly by the control unit 1138.

In this variant, the battery may also be used in regenerative mode, in a manner analogous to the fifth and sixth embodiments. The battery also serves to limit the maximum power demanded by the actuator from the power supply network.

It should be observed that in the fifth and sixth embodiments and also in this variant, the battery may also be charged via the machine and the inverter associated with the battery, both when the machine is stationary and when it is rotating, thus making it possible to omit a rectifier.

Furthermore, in the fifth and sixth embodiments and in this variant, the actuator is fitted with an electric battery, however that could be replaced by a supercapacitor or some other component. More generally, any electricity storage member may be used in this context.

It should be observed that the invention that is described above in the context of actuators having synchronous electrical machines can be applied equally well to actuators having asynchronous electrical machines. In general, the invention applies to actuators having polyphase electrical machines capable of being powered by two converters, making it possible to implement a power supply architecture of the series type with two paths for connection to a single source of electricity or to two distinct sources of electricity.

The electrical power supply network(s) may be of the three-phase alternating type, as in the examples described above, however these networks could equally well be of the single-phase alternating type or of some other type, and the rectifiers may be simple diode rectifiers or they may be controlled rectifiers, as in the examples described above.

Finally, the electrical power supply networks may also be direct current networks, in which case there is no need for the buses to be fitted with rectifiers.

The invention claimed is:

1. An electrical actuator (300-1100) comprising:
   a polyphase electrical machine (301-1101);
   a first and a second connection member (343-1143, 344-844) for connection to one or two electrical power supply networks (346-1146, 347-847);
   first and second buses (306-1106, 307-1107) connected in parallel between the machine (301-1101) and each connection member (343-1143, 344-844), the first and second buses (306-1106, 307-1107) including respective first and second inverters (311-1111, 331-1131) for applying frequency control to the machine (301-1101), each inverter (311-1111, 331-1131) having a plurality of arms each provided with two controlled switches, each phase of the machine (301-1101) being connected both to the two switches of an arm of the first inverter (311-1111) and also to the two switches of an arm of the second inverter (331-1131); and
   connection and disconnection control means interposed between the buses (306-1106, 307-1107) and each connection member,
   wherein the connection and disconnection control means comprises a first contactor (336-836) connecting the first bus (306-806) to the first connection member (343-843) and a second contactor (337-837) connecting the second bus (307-807) to the second connection member (344-844).

2. An actuator (900-1100) according to claim 1, having an electricity storage member (951-1151) and a two-position switch (952-1152) that are interposed between the connection member (943-1143) and the inverter (931-1131) of one of the buses (907-1107), said electricity storage member (951-1151) having one terminal connected to the connection member (943-1143) and to the inverter (931-1131) and one terminal connected to the two-position switch (952-1152) so as to be connected either to the connection member (943-1143) in order to be recharged, or to the inverter (931-1131) in order to power it or to be charged therefrom.

3. An actuator (400, 600, 800, 1100) according to claim 1, including a multiple switch (371-1171, 372-1172), connected to the two switches in each arm of one of the inverters, said multiple switch (371-1171, 372-1172) being capable of occupying an open position in which said arms are isolated from one another or a closed position in which said arms are electrically connected to one another.

4. An electrical actuator (300-1100) comprising:
   a polyphase electrical machine (301-1101);
   a first and a second connection member (343-1143, 344-844) for connection to one or two electrical power supply networks (346-1146, 347-847);
   first and second buses (306-1106, 307-1107) connected in parallel between the machine (301-1101) and each connection member (343-1143, 344-844), the first and second buses (306-1106, 307-1107) including respective first and second inverters (311-1111, 331-1131) for applying frequency control to the machine (301-1101), each inverter (311-1111, 331-1131) having a plurality of arms each provided with two controlled switches, each phase of the machine (301-1101) being connected both to the two switches of an arm of the first inverter (311-1111) and also to the two switches of an arm of the second inverter (331-1131); and
   connection and disconnection control means interposed between the buses (306-1106, 307-1107) and each connection member,
   wherein the connection and disconnection control means comprise a first contactor (536-636) connected to the first bus (506-606), a second contactor (537-637) connected to the second bus (507-607), and a two-position switch (539-639) for connecting the first and second contactors (536-636, 537-637) either to the first connection member (543-643) or to the second connection member (544-644).

5. An electrical actuator (300-1100) comprising:
   a polyphase electrical machine (301-1101);
   a first and a second connection member (343-1143, 344-844) for connection to one or two electrical power supply networks (346-1146, 347-847);
   first and second buses (306-1106, 307-1107) connected in parallel between the machine (301-1101) and each connection member (343-1143, 344-844), the first and second buses (306-1106, 307-1107) including respective first and second inverters (311-1111, 331-1131) for applying frequency control to the machine (301-1101), each inverter (311-1111, 331-1131) having a plurality of arms each provided with two controlled switches, each phase of the machine (301-1101) being connected both to the two switches of an arm of the first inverter (311-1111) and also to the two switches of an arm of the second inverter (331-1131); and
   connection and disconnection control means interposed between the buses (306-1106, 307-1107) and each connection member,
   wherein the connection and disconnection control means comprise a first three-position switch (736-836) connected to the first bus (706-806) and to the first and second connection members (743-843, 744-844), and a second three-position switch (737-837) connected to the second bus (707-807) and to the first and second connection members (743-843, 744-844).

* * * * *